Dec. 17, 1968     I. J. HUTKIN     3,416,971
FILAMENTARY THERMAL CELL WITH IONICALLY
CONDUCTIVE GLASS COATING
Filed July 26, 1965     2 Sheets-Sheet 1
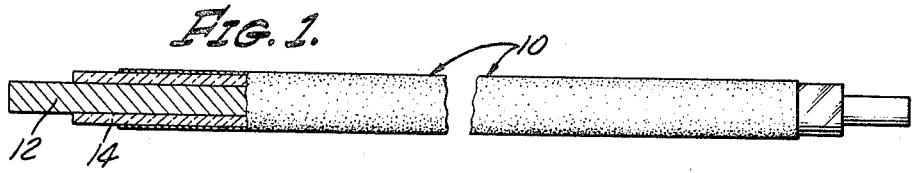
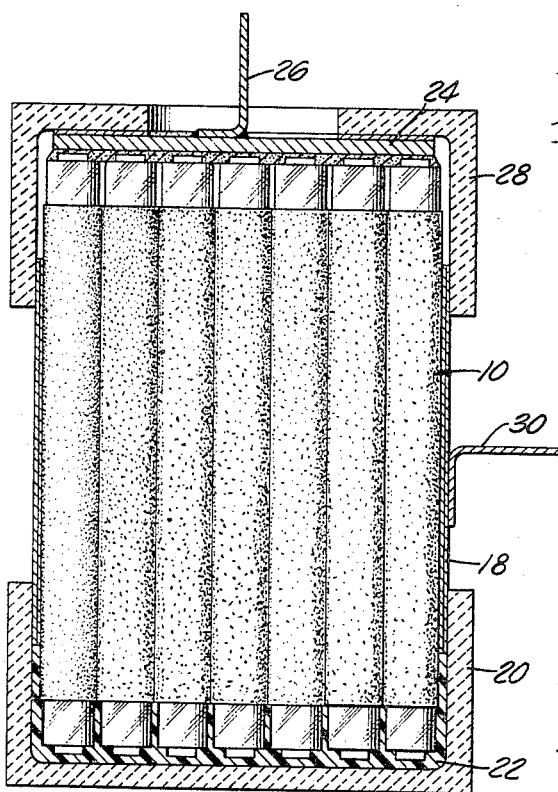
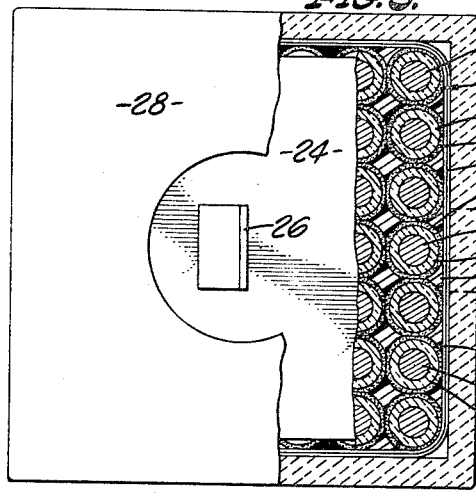
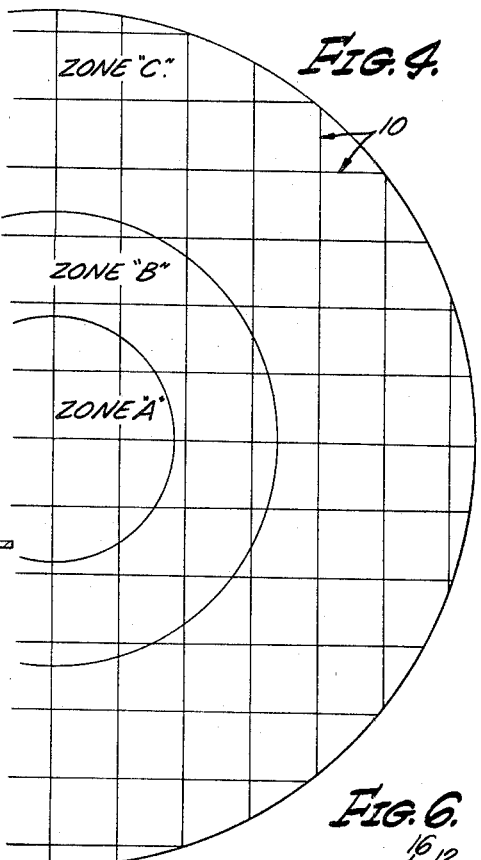
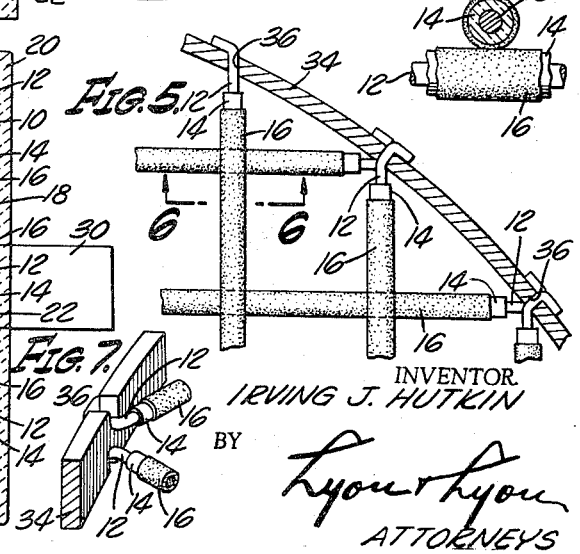
INVENTOR.
IRVING J. HUTKIN
BY Lyon & Lyon
ATTORNEYS Dec. 17, 1968     I. J. HUTKIN     3,416,971
FILAMENTARY THERMAL CELL WITH IONICALLY
CONDUCTIVE GLASS COATING Filed July 26, 1965     2 Sheets-Sheet 2

INVENTOR.
IRVING J. HUTKIN
BY Lyon & Lyon
ATTORNEYS

United States Patent Office 3,416,971
Patented Dec. 17, 1968

3,416,971
FILAMENTARY THERMAL CELL WITH IONICALLY CONDUCTIVE GLASS COATING
Irving J. Hutkin, San Diego, Calif., assignor to Whittaker Corporation, Los Angeles, Calif., a corporation of California
Filed July 26, 1965, Ser. No. 475,022
4 Claims. (Cl. 136—205)

ABSTRACT OF THE DISCLOSURE

A filamentary thermal cell having a solid metallic core, a glass coating disposed on the core and a metallic sheath disposed on the glass coating, the metals of which the core and sheath are composed being dissimilar. The glass coating is ionically conductive at the operating temperature range so that when the cell is heated to within this range electrical energy is generated.

Figure 9:
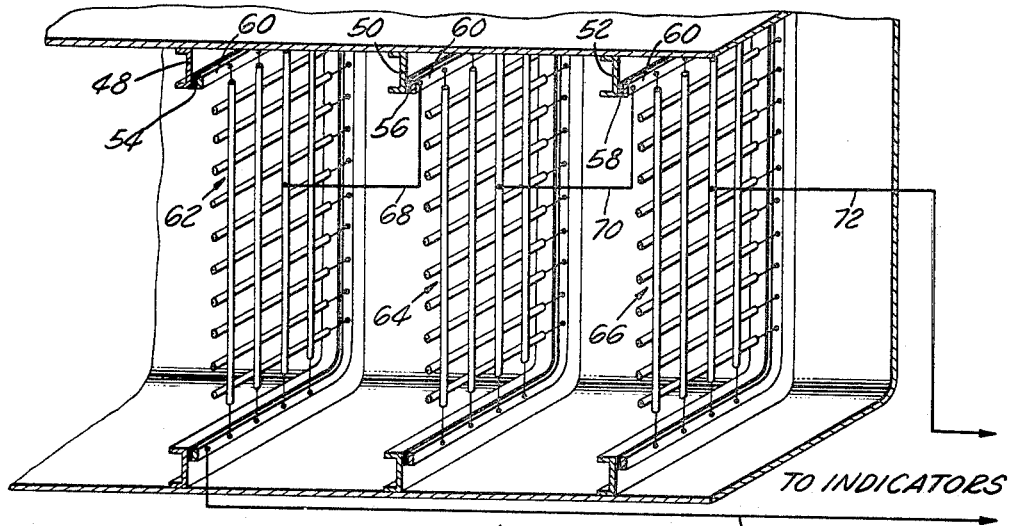

This invention relates to energy conversion and more particularly relates to a thermally activated battery configuration in the form of a fiber and systems incorporating the same.

There are many instances where a device that converts thermal energy to electrical energy is useful. For example, such a device is ideal as a sensor for detecting fires or other high temperature conditions. Currently, thermistors or thermocouples are often used for this purpose. The use of thermistors requires a power source with a relatively constant output characteristic and are subject to failure as a result of rough handling or exposure to moisture. Thermocouples eliminate the need for an external power supply but have very small power outputs and are also relatively fragile.

According to the present invention, a thermally activated cell is provided that is so sturdy that it itself can be used to add strength to a structure in which it is incorporated. It can be constructed in almost any geometric configuration and in such a manner as to produce a substantial power output. Since the device generates energy only when heated, freedom from false alarms is inherent in its use.

The thermal cell of the present invention basically consists of a filament having a metallic core, a coating of a suitable glass composition on the core, and a coating of a second metal deposited over the glass coating. Heating such a structure to within the designed operating temperature range results in the glass serving as an electrolyte between the two metal electrodes and causes electrical energy to be produced. The devices or cells can be made in any desired lengths and can be assembled in various shapes and combinations to produce desired voltage and energy output characteristics. For example, a plurality of such cells can be physically connected to form a large area web in which the cells are electrically connected in parallel, whereby the magnitude of the power output would indicate the size of a fire present in an area adjacent the web.

It is therefore an object of the present invention to provide a thermal device for producing electrical energy when heated to within a preselected temperature range.

It is also an object of the present invention to provide such a device which is of rugged and durable construction and which can itself serve as a structural member.

It is another object of the present invention to provide such a device which can be formed into a large number of geometric shapes and which can be mechanically and electrically connected with other such devices into any desirable pattern with any desirable output characteristic.

It is a further object of the present invention to provide a plurality of such devices mechanically and electrically connected into a web useful in the detection of fire.

It is a still further object of the present invention to provide a plurality of such webs so as to provide a three dimensional representation of a fire.

Figure 8:
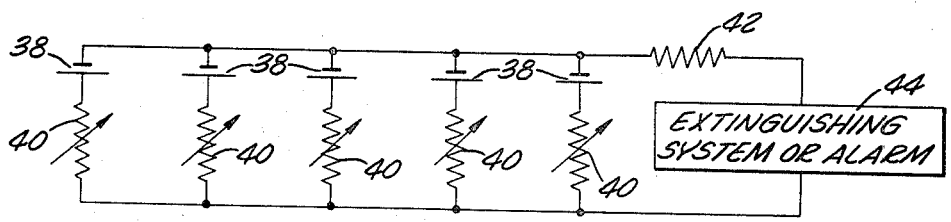
Figure 10:
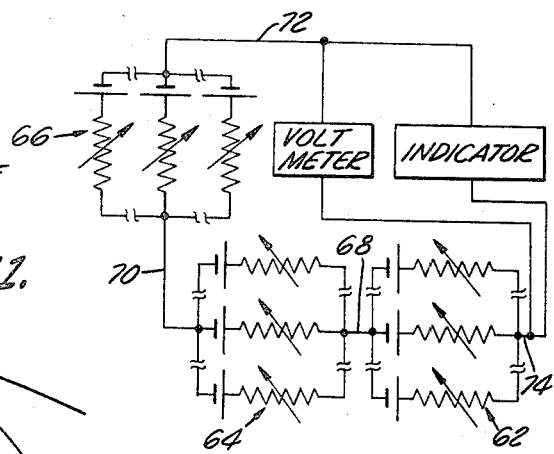
Figure 11:
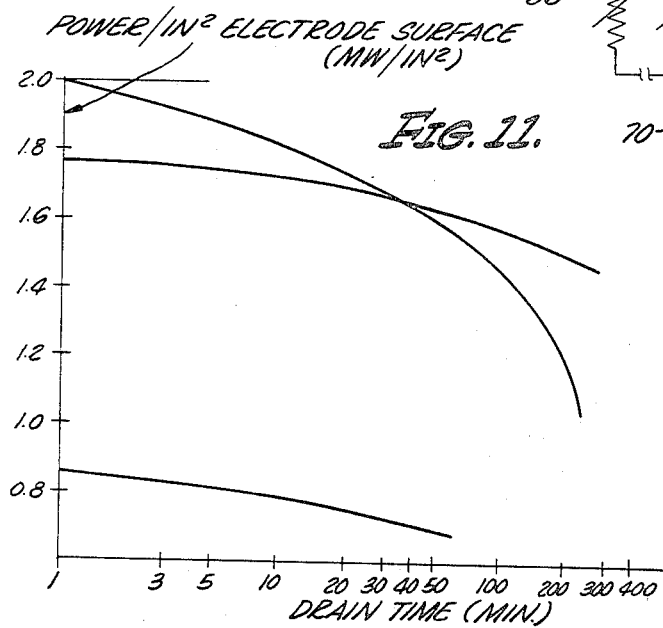

These and other objects of the present invention will become more apparent upon reference to the accompanying description and drawings in which:

FIGURE 1 is a side elevation, partly in section, of the thermal cell of the present invention;
FIGURE 2 is a cross sectional view of a thermal battery made up of a plurality of the thermal cells of the present invention;
FIGURE 3 is a plan view, partly broken away and in section of the battery of FIGURE 2;
FIGURE 4 is a schematic representation of a web made up of a plurality of thermal cells;
FIGURE 5 is a detailed view of a section of a web of FIGURE 4;
FIGURE 6 is a view taken along lines 6—6 of FIGURE 5;
FIGURE 7 is a perspective view of the edge connection of the various cells in the web of FIGURES 4 and 5;
FIGURE 8 is a schematic diagram of the electrical circuit of the web of FIGURES 4 and 5;
FIGURE 9 is a representational view of a plurality of webs of thermal cells according to the present invention mounted in an aircraft or other vehicle;
FIGURE 10 is a schematic diagram of the electrical circuit of the webs of FIGURE 9; and
FIGURE 11 illustrates the output characteristics of various cells constructed in accordance with the teachings of the present invention.

Turning now to FIGURE 1, the thermal cell 10 of the present invention has a cylindrical metal core 12, a glass coating 14 disposed on the core and a metal sheath 16 deposited on the glass coating. It has been found that by using two dissimilar metals and a glass composition that is an ionic conductor in the operating temperature range, useful electric power is generated when the cell is heated. The materials used for the two metal electrodes and the glass electrolyte must be selected from those that will suitably withstand the expected service temperatures. At the same time they must provide the necessary elecrode potential and a minimized electrolyte resistance at the operating temperature to provide useful power.

As anode materials, iron and stainless steel have been found satisfactory in combination with cathode metals such as silver or copper. The anode may also be made of iron, chromium, nickel, or high temperature alloys in which one or more of these metals is a major constituent. Since it is possible to use these anode materials as the core 12, their oxidation resistance does not limit their utility at temperatures up to their melting points. As cathode materials, palladium and gold as well as silver and copper are useful, as are alloys having one or more of these metals as a major constituent. The excellent oxidation resistance of the more noble metals of this group, plus the relative ease with which they can be deposited as thin coatings, recommends their use as the outer metal sheath 16.

Two of the more common glass constituents that satisfy the ionic conduction requirement are $Na_2O$ and $K_2O$. Other oxides of alkali metals, such as $Li_2O$, are also contemplated for use. When these are present in the glass electrolyte in amounts exceeding a few percent, it has been found that considerable electrical energy is generated when the device is heated at temperatures as low as 800° F. A corresponding decrease in the resistivity of the glass electrolyte also occurs at elevated temperatures.

Other glass constituents such as $B_2O_3$, $SiO_2$, $Al_2O_3$,

TiO$_2$, ZrO$_2$, MgO, etc., can be used in the formulation of a glass composition tailored to meet other important criteria, such as a suitable coefficient of thermal expansion, as will be apparent to those skilled in the art. It has been found that the glass composition can be varied to produce a higher power output for short-term load applications or a lower, more stable power output for long-term load applications. A further effect of varying the glass composition can be to raise or lower the optimum operating temperature range or to vary the width of the ranges. Examples of useful compositions are:

Example I.—A glass having a composition by weight of 30% Na$_2$O, 30% B$_2$O$_3$ and 40% SiO$_2$ was coated on a metal core of type 304 stainless steel and a sheath of silver was then vapor deposited on the glass coating. The resulting device was found to have an optimum operating temperature range of 1250–1450° F.

Example II.—A glass having a composition by weight of 30% Na$_2$O, 30% B$_2$O$_3$, 20% SiO$_2$ and 20% Al$_2$O$_3$ was coated on a metal core of type 304 stainless steel and a sheath of silver was then vapor deposited on the glass coating. The resulting device was found to have an optimum temperature range of 1450–1575° F.

As can be seen from FIGURE 11, these two compositions have quite different power output characteristics. Composition I provides a higher initial power output than does Composition II when used with the same electrode combination, but Composition II produces a greater total energy output over an extended drain time. FIGURE 11 also shows the power output characteristic of a device in which Composition II is used with an iron core or anode and a silver cathode. It can be seen that a large power output can be obtained by making the cell of long length and consequent large surface area. Rather than have a single cell of extremely long length, a plurality of short cells can be suitably stacked and bound together, for example, in the manner shown in FIGURES 2 and 3.

In FIGURES 2 and 3, a plurality of cells 10, each having a core 12, a glass coating 14 and a metallic sheath 16 are tightly bundled together by a sheet or sheets of metal foil 18 so that the sheath 16 of each cell is pressed into good electrical contact with the sheaths of the adjoining cells. Each cell is formed so that its metal sheath does not extend to the end of the glass coating, which in turn does not extend to the end of the central core. The lower ends of the cells are positioned in an insulating cap 20 and then potted in any suitable insulating material 22 such as a castable ceramic.

A conductive plate 24 is positioned on top of the cells and brazed or soldered to the cores thereof. An electrode or terminal 26 is soldered to plate 24 and a second insulating cap 28 positioned over the assembly. A second electrode or terminal 30 is suitably connected to the foil 18 to serve as a contact to the cell sheaths which as mentioned above are generally the cell cathodes. Electrically, this construction results in the many cells being connected in parallel. It should be obvious to those skilled in the art that minor modifications can be made in such a structure so that many different electrical series-parallel connections of the cell can be obtained.

As an example of the electrode surface areas obtainable in this type of assembly, approximately 250,000 cells, each .002 inch in diameter, can be stacked in a one inch cube. If the metal core is assumed to be .001 inch in diameter, the cube will contain almost 800 square inches of surface area. Using the power output data shown in FIGURE 11 for composition II with a stainless steel core, and assuming that the total power output is directly proportional to electrode surface area, it can be seen that such a one inch cube can produce approximately 5.9 watt-hours over the time period plotted.

Turning now to FIGURES 4, 5, 6 and 7 there is shown a portion of web or mesh constructed of a plurality of the cells of FIGURE 1. The cells are mounted on a conductive ring 34 by passing the ends of their metal cores through apertures or notches 36, bending them over and spot welding them to the ring (FIGURE 7). The ring 34 thus serves as the common anode connection or terminal if the metal core of each cell is chosen as the anode. The various cells are interwoven so that their outer metallic sheaths are in close mechanical and good electrical contact at the cross-over points (FIGURE 6) so that the cathodes of the cells are connected together.

The external cathode connection or terminal may be made to one or more of the metallic sheaths. The electrical representation of this web is shown in FIGURE 8. Each of the batteries 38 is a single cell 10 while each resistance 40 corresponds to the internal resistance of the cell. All of the cells are connected in parallel and the parallel combination connected in series with a current limiting resistance 42 and any suitable extinguishing system or alarm 44.

The web illustrated may be located in any area where there is a fire hazard. Since the web can be made to have very little weight, it could be made to blanket a large hazard area of, for example, a flight vehicle by bonding or otherwise attaching it to the structure in which the hazard exists without significantly affecting the weight of the vehicle. Only the portion of each cell located sufficiently close to a fire to be heated to its operating temperature will produce useful power. The portions of the cells in web areas adjacent the hot zone are at lower temperatures and remain relatively inert.

This concept is illustrated in FIGURE 4 where the web is shown as divided into three concentric zones, a central zone A, an intermediate zone B and an outer zone C. Assume that the cells are constructed so that they begin to produce useful power when heated to 1000° F. If the web is heated by a fire so that the temperature in zone A rises to between 1000° F. and 1600° F., useful power will be produced only by the portions of the cells within that zone. In zone B the fire may have raised the temperature only to between 500° F. and 1000° F., and the internal resistance of the glass electrolyte of each cell will be very high and the power produced by these cell portions will be negligible. The temperature of the portions of the cells in zone C will be even less and they also will produce negligible power.

The metallic cores in zones B and C remain conductive, however, and serve as insulated leads between the power producing cell portions in zone A and the extinguishing system or alarm. If the fire becomes larger or more intense the cell portions in zones B and C begin to produce power so that the total output increases. The increased output can be used to actuate additional extinguishing devices or further alarms.

A plurality of webs connected electrically in series may be used to give a three dimensional picture of a fire. For example, a web could be mounted on or made a structural part of each of three successive bulkheads 48, 50 and 52 in an aircraft or a ship as shown in FIGURE 9, and electrically connected in series. In FIGURE 9, the bulkheads 48, 50 and 52 are provided with insulating strips 54, 56 and 58 respectively, each strip having a conductive strip 60 mounted thereon to which the webs 62, 64 and 66 are fastened by welding or the like. The webs are connected in a series circuit with suitable indicators by the conductors 68, 70, 72 and 74. The electrical schematic diagram of this arrangement is shown in FIGURE 10. If a fire begins adjacent the central bulkhead 50, the web 64 mounted thereon would be heated and produce an energy output corresponding to this area. If the fire spread to the areas adjoining bulkheads 48 and 52, the webs 62 and 66 also begin to produce an output. Thus, the total energy produced reflects the web area heated while the voltage generated as a result of the web series connection indicates the depth of the fire.

From the foregoing description, it can be seen that a thermally activated cell has been provided in the shape of a fiber or filament, that is simple in construction, rugged, and capable of producing a relatively large power output and yet can be made very compact and lightweight. If desired, it can also be constructed to add strength to the structure in which it is incorporated. The cell is particularly useful when combined with others to form a fire hazard detector because it is essentially foolproof and can produce sufficient power to actuate an extinguishing or alarm device. It should be understood that the various combinations, both mechanical and electrical, shown and described are illustrative only and many other useful combinations will occur to those skilled in the art.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A filamentary thermal cell for producing electrical energy when heated to within a preselected operating temperature range comprising an elongated stainless steel core, a glass coating disposed on said core, said glass having a composition by weight of approximately 30% $Na_2O$, 30% $B_2O_3$ and 40% $SiO_2$ and being ionically conductive within said operating temperature range, and a silver sheath disposed on said glass coating.

2. A filamentary thermal cell for producing electrical energy when heated to within a preselected operating temperature range comprising an elongated stainless steel core, a glass coating disposed on said core, said glass having a composition by weight of approximately 30% $Na_2O$, 30% $B_2O_3$, 20% $SiO_2$ and 20% $Al_2O_3$ and being ionically conductive within said operating temperature range, and a silver sheath disposed on said glass coating.

3. A thermal battery comprising a plurality of cells, each of said cells comprising an elongated core of stainless steel, a glass coating disposed on said core, said glass coating having a composition by weight of approximately 30% $Na_2O$, 30% $B_2O_3$, 20% $SiO_2$ and 20% $Al_2O_3$ and being ionically conductive when heated to within a preselected operating temperature range and a silver sheath disposed on said glass coating, means for maintaining said cells in electrically parallel relationship with the sheath of each cell engaging the sheaths of adjoining cells; conductive means engaging the core of each cell to provide a first terminal; and means engaging the sheath of at least one of said cells to provide a second terminal.

4. A thermal battery comprising a plurality of cells, each of said cells comprising an elongated core of stainless steel, a glass coating disposed on said core, said glass coating having a composition by weight of approximately 30% $Na_2O$, 30% $B_2O_3$ and 40% $SiO_2$ and being ionically conductive when heated to within a preselected operating temperature range and a silver sheath disposed on said glass coating; means for maintaining said cells in electrically parallel relationship with the sheath of each cell engaging the sheaths of adjoining cells; conductive means engaging the core of each cell to provide a first terminal; and means engaging the sheath of at least one of said cells to provide a second terminal.

References Cited

UNITED STATES PATENTS

| | | | |
|---|---|---|---|
| 1,506,962 | 9/1924 | Andrews | 136—203 |
| 2,622,116 | 12/1952 | Maize | 136—200 X |
| 2,805,272 | 9/1957 | Postal | 340—228 X |
| 3,020,325 | 2/1962 | Winckler | 136—208 |
| 3,089,339 | 5/1963 | Rogers et al. | 338—26 X |
| 3,306,833 | 2/1967 | O'Leary | 106—54 X |

FOREIGN PATENTS

| | | |
|---|---|---|
| 161,218 | 2/1955 | Australia. |
| 800,550 | 8/1958 | Great Britain. |

ALLEN B. CURTIS, *Primary Examiner.*

U.S. Cl. X.R.

136—236; 340—228; 117—217; 106—54; 338—26; 252—518